No. 637,088. Patented Nov. 14, 1899.
T. H. COSTELLO.
GLOBE.
(Application filed May 22, 1899.)
(No Model.)
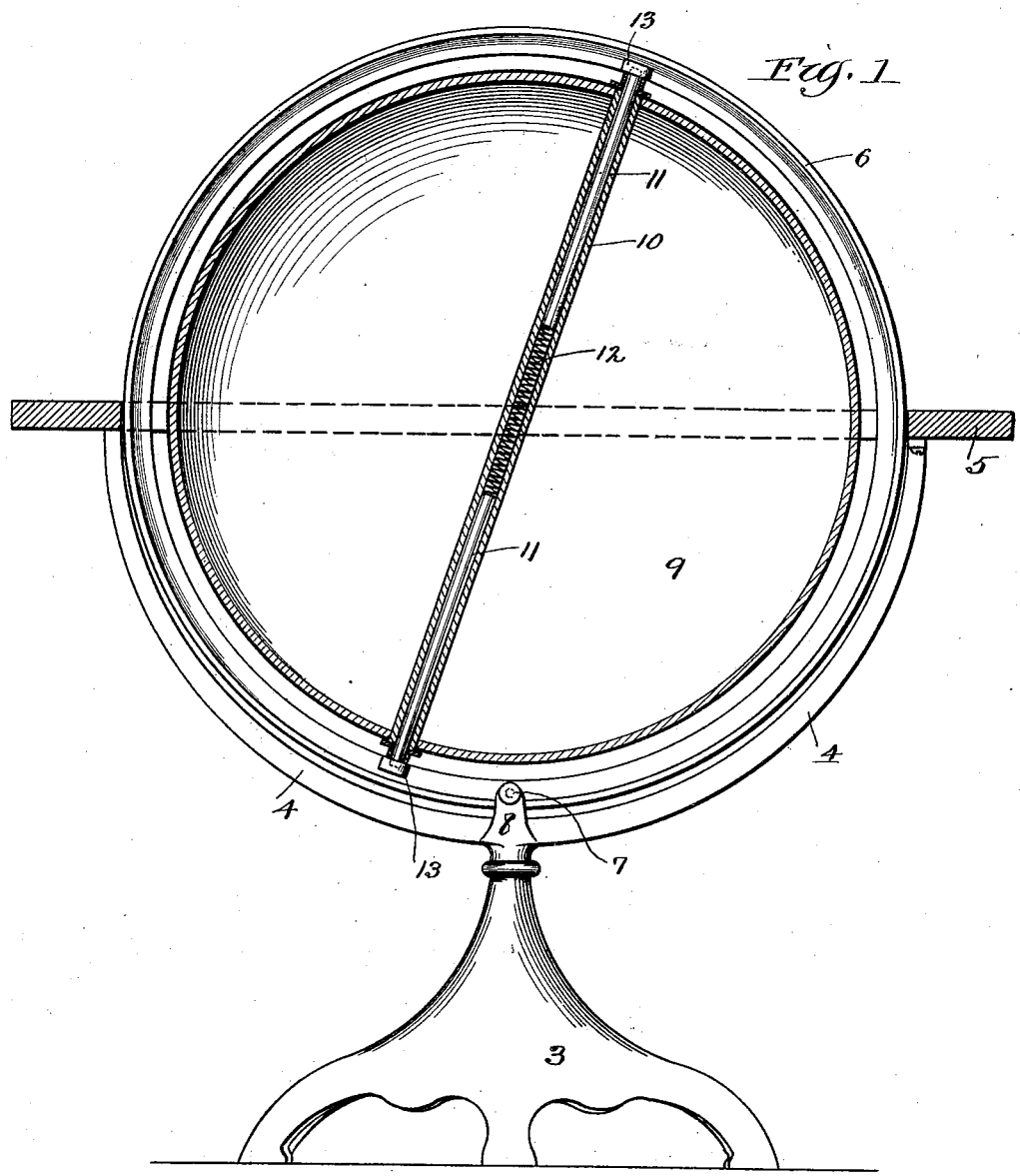
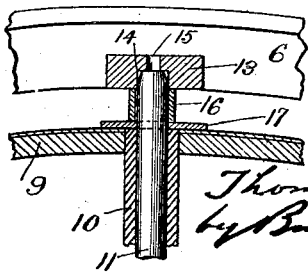
Witnesses:
Inventor:
Thomas H. Costello
Attys

UNITED STATES PATENT OFFICE.

THOMAS H. COSTELLO, OF CHICAGO, ILLINOIS.

GLOBE.

SPECIFICATION forming part of Letters Patent No. 637,088, dated November 14, 1899.

Application filed May 22, 1899. Serial No. 717,708. (No model.)

*To all whom it may concern:*

Be it known that I, THOMAS H. COSTELLO, residing at Chicago, in the county of Cook and State of Illinois, have invented certain new and useful Improvements in Globes, of which the following is a specification, reference being had to the accompanying drawings.

Globes in general use are hollow and formed of a paper shell which is covered with successive layers or coatings of composition upon which when thoroughly dried the map is secured. It is of course intended that the composition shall be evenly applied, so that the globe will when finished be perfectly balanced upon its axis; but to obtain this result is frequently a difficult matter, and a true or perfect balance is often only obtained by means of small weights let into the surface at the proper place. To avoid the trouble and expense of thus compensating for any inequality that would tend to prevent the globe from balancing properly on its axis is one of the objects of my invention. It is also the case in the construction of globes as now generally made that the axis of the globe is secured in place by resting the ends thereof in suitable bearings one-half of each of which is made of a removable clip or bridge-piece that is secured in place by screws. By my invention I dispense with such clip or bridge-piece of the bearing and instead thereof provide a socket or hole in the support for each end of the globe's axis, into which the ends of such axis can be readily placed owing to the construction of the axis, all as shown in the drawings and hereinafter specifically described, and all that is new will be pointed out in the claims.

In the accompanying drawings, Figure 1 is a central vertical section through an ordinary globe provided with my improvements, the supporting-base and vertically-arranged encircling ring or "meridian-circle" being shown in elevation; and Fig. 2 is a detail, partly in section, illustrating the manner of securing the end of the globe's axis in place.

3 indicates a suitable supporting-base, on the upper end of which are curved arms 4 4, that support a horizontally-arranged ring or "horizon-circle" 5, as usual. 6 indicates a vertically-arranged ring or meridian-circle that surrounds the globe and lies between such globe and the curved arms 4. It is adjustably secured in place by a screw 7 passing through an ear 8 on the upper end of the base 3. It is braced by passing through slots cut at opposite sides in the inner edge of the ring 5. The rings 5 and 6 will of course be provided with the usual markings. 9 indicates the globe.

The parts so far referred to by reference-numerals are old and well known and therefore need no further specific description.

10 indicates a passage in the form of a tube passing centrally through the globe and fixed thereto. 11 indicates a divided axis within the tube 10 and having a coiled spring 12 between the two parts of said axis, said spring being adapted to keep the two parts of the axis projected from the tube for a short distance.

13 indicates two oppositely-located ears projecting from the side of the ring 6, on the inner faces of which are formed sockets 14, adapted to receive and stop the projecting ends of the divided axis, and each provided also with a small passage 15, communicating with the socket 14 to enable a wire or suitable tool to be inserted to push back the axis from the socket to allow of removal of the globe when desired for any purpose. 16 and 17 indicate, respectively, a collar and a washer on each projecting end of the axis between the ear 13 and the surface of the globe 9.

To secure the globe in place, the ring 6 is removed from its supporting devices and placed around the globe and one of the projecting ends of the divided axis 11 is inserted in one of the sockets 14. The other projecting end of the axis is then to be pressed upon to force such portion of the axis back far enough to allow it to be brought under its ear 13, and when in line with the socket 14 in such ear the action of the spring 12 will shoot it into such socket, thus pivotally securing the globe in place within the ring 6, when such ring can be secured in place as described and the globe used as usual. The removal of the globe from the ring 6 is readily effected by pushing back one of the parts of the axis sufficiently far to allow its end to be disengaged from the socket, a suitable tool being passed through the passage 15 for this purpose.

When the divided axis is secured as described, the spring 12 will of course be compressed to some extent and by reason of such compression will be forced more or less against the wall of the tubular passage 10, the effect of which is to cause said spring to act in the nature of a brake against the rotation of the globe on its axis. This braking effect is very slight with a proper spring, but is found sufficient to hold the globe in any position to which it may be turned or adjusted, notwithstanding such globe may be slightly heavier on one side than the other. By reason of the spring-pressure so holding the globe it becomes unnecessary for the manufacturer to exercise great care in securing a perfect balance before placing the article on the market, and thereby cheapens the cost of production. The size and strength of the spring will of course be varied to suit different sizes of globes, and can, if desired, vary in globes of the same size to suit different inequalities in construction that would affect the balancing.

While acting perfectly as a brake, as above explained, the spring, if of the right size and strength, will in no wise impede the easy rotation of the globe by the user.

That which I claim as my invention, and desire to secure by Letters Patent, is—

1. The combination with a globe of a central passage therethrough, a divided axis in said passage, a device in said passage between the parts of said axis adapted to engage the wall of the passage when the ends of the axis are journaled in place, and a suitable support for the ends of said axis, the globe being susceptible of revolving about said divided axis, substantially as and for the purpose specified.

2. The combination with a globe of a central passage therethrough, a divided axis in said passage, a coiled spring between the inner ends of said divided axis adapted to force said axis outward and also adapted to frictionally engage the wall of said passage, and a suitable support and stop for the ends of said axis, substantially as and for the purposes specified.

3. The combination with a globe of a central passage therethrough, a divided axis in said passage, a spring between the inner ends of said divided axis adapted to keep the outer ends of the axis forced outward, and a suitable support and stop for the outer ends of the axis, substantially as and for the purpose specified.

4. The combination with a base, a globe and a ring surrounding the globe, supported by the base and having opposite axis-bearings, of a tubular passage extending through the globe, a divided axis for the globe, arranged within said tubular passage and the sections of which are movable longitudinally within and maintained in alinement by said tubular passage, and means for holding the outer ends of the sections composing said divided axis in the axis-bearings on the ring, substantially as and for the purpose specified.

5. The combination with a globe, and suitable axis-supports, of a tubular passage extending through the globe, a divided globe-axis arranged within said tubular passage and having the inner ends of the sections thereof separated to enable them to be moved longitudinally toward each other within the tubular passage, the latter serving to hold the said sections in alinement, and means for holding the outer ends of said divided axis in said axis-supports, substantially as and for the purposes described.

THOMAS H. COSTELLO.

Witnesses:
ALBERT H. ADAMS,
JULIA M. BRISTOL.